US005741882A

United States Patent [19]
Fujii et al.

[11] Patent Number: 5,741,882
[45] Date of Patent: Apr. 21, 1998

[54] ALIPHATIC POLYESTER AND A PROCESS FOR THE PREPARATION THEREOF

[75] Inventors: Takeaki Fujii; Kenji Kobayashi, both of Iruma-gun; Sadakatsu Suzuki, Kawaguchi; Hiroshi Ueno, Hiki-gun, all of Japan

[73] Assignee: Tonen Corporation, Tokyo, Japan

[21] Appl. No.: 531,694

[22] Filed: Sep. 21, 1995

[30] Foreign Application Priority Data

Sep. 21, 1994 [JP] Japan .................................. 6-253003
Oct. 11, 1994 [JP] Japan .................................. 6-270197
Feb. 7, 1995 [JP] Japan .................................. 7-041383

[51] Int. Cl.⁶ .............................. C08G 63/78; C08K 3/10
[52] U.S. Cl. .......................... 528/279; 528/272; 528/275; 528/279; 528/280; 528/281; 528/283; 524/755; 524/783; 524/784; 524/785; 524/788

[58] Field of Search .................................. 528/272, 275, 528/279, 280, 281, 283; 524/755, 783, 784, 785, 788

[56] References Cited

FOREIGN PATENT DOCUMENTS

| 0 472 179 | 2/1992 | European Pat. Off. . |
| 0 565 235 | 10/1993 | European Pat. Off. . |
| A-06 145 313 | 5/1994 | Japan . |

*Primary Examiner*—Samuel A. Acquah
*Attorney, Agent, or Firm*—Cowan, Liebowitz & Latman, P.C.

[57] ABSTRACT

A process to prepare a high molecular weight aliphatic polyester is disclosed, where a catalyst is portionwise added, and a radical scavenger is also added. The aliphatic polyester obtained has a number average molecular weight larger than 70,000.

19 Claims, No Drawings

ALIPHATIC POLYESTER AND A PROCESS FOR THE PREPARATION THEREOF

FIELD OF THE INVENTION

The invention relates to an aliphatic polyester, more specifically a high molecular weight aliphatic polyester suitable for molding products, films, and fibers and a process for the preparation thereof.

PRIOR ART

Aliphatic polyesters were mostly synthesized by polycondensation of dibasic aliphatic carboxylic acids such as oxalic acid, malonic acid, succinic acid and adipic acid with aliphatic glycols such as ethylene glycol and 1,4-butanediol. However, in these reactions, it was very difficult to synthesize aliphatic polyesters with a number average molecular weight (Mn) larger than 20,000. The obtained aliphatic polyesters with a Mn less than 20,000 do not have sufficient mechanical properties as generally required for resins, such as strength. Accordingly, it was difficult to process those into films, fibers or other shaped articles. In addition, those have too large melt flow rates (MFR) and, therefore, cannot be molded by instruments used for processing usual resins. Further, the dibasic aliphatic carboxylic acids are solid at room temperature. Accordingly, a large stirring power is needed when the reaction with the aliphatic glycol is started.

There is known a two-step process to obtain high molecular weight aliphatic polyesters, where a dibasic aliphatic carboxylic acid is converted with an aliphatic glycol into an aliphatic polyester which is then reacted with a cross-linking agent such as diisocyanates, resulting in a higher molecular weight (Japanese Patent Application Laid-Open Nos. Hei-4-189822/1992 and Hei-5-287043/1993). The process has disadvantages that the process comprises two steps, which makes operations complicated; and the crosslinking causes decrease in tensile strength and elongation., formation of gel and waving of films, so that it is again difficult to produce shaped articles or films good for use. Further, nitrogen or metal elements contained in the cross-linking agents cause decrease in electric non-conductance, discoloration, deterioration of biodegradability and environmental concern of biodegradable products.

Among the aforesaid aliphatic polyesters, those from oxalic acid or succinic acid as an acid component have a relatively high melting point and are suitable to be used as a resin. However, it is known that those from oxalic acid are less stable to heat and tends to decompose.

In order to increase a degree of polymerization, it might be thought to use a higher vacuum or a higher reaction temperature.

Japanese Patent Application Laid-Open No. Hei-5-310898/1993 discloses a process to prepare a high molecular weight aliphatic polyester, where a glycol component is converted with an aliphatic dicarboxylic acid or anhydride thereof into a polyester diol which is then subjected to a high temperature and a high vacuum (0.005 to 0.1 mmHg) in the presence of a catalyst to cause a reaction of removing glycol. The aliphatic polyesters obtained in that process have a Mn of at most 70,000, and none of the polyesters have a Mn larger than 70,000. In addition, high vacuum is required for the reaction, which makes operations complicated and needs special and expensive apparatuses.

When a higher reaction temperature is used, impurities which might be present in the reaction system cause depolymerization, deactivation of a catalyst and discoloration, so that it is mostly impossible to obtain a less-discolored aliphatic polyester with a desired Mn.

There is another known route where a cyclic lactone is ring-opening polymerized to give an aliphatic polymer from a hydroxyacid.

SUMMARY OF THE INVENTION

An object of the present invention is to provide an improved process for the preparation of an aliphatic polyester by polycondensation of a diester of a dibasic aliphatic carboxylic acid with an aliphatic glycol.

Another object of the invention is to provide a high molecular weight aliphatic polyester which has excellent mechanical properties such as Izod impact strength, and has a melt flow rate suitable to produce molded articles, films and fibers.

Thus, the present invention provides a process for the preparation of an aliphatic polyester by reaction of a diester of a dibasic aliphatic carboxylic acid with an aliphatic glycol, characterized in that a catalyst is added to a reaction system portionwise at least twice at an interval of at least ten minutes in a period of time of the reaction including a starting point of the reaction.

In a preferred embodiment of the process, 0.001 to 1 mole %, based on the diester of the dibasic aliphatic carboxylic acid, of a radical scavenger is added to the reaction system.

In the above preferred embodiment, the process more preferably comprises steps of (1) carrying out the reaction in the presence of 0.001 to 1 mole %, based on the diester of the dibasic aliphatic carboxylic acid, of a radical scavenger at a pressure of from atmospheric pressure to 20 Torr at a temperature of 20° to 230° C. under distillation of the esterifying monovalent alcohol until the distillation is substantially completed, and then (2-1) carrying out the polycondensation reaction at a pressure of 20 to 0.5 Torr at 150° to 250° for 0.5 to 2 hours, and further, (2-2) carrying out the polycondensation reaction at a pressure of less than 1 Torr to 0.05 Torr at 200° to 250° C. for 1 to 10 hours;

wherein the catalyst is added to the reaction system once at the starting point of the reaction and at least once in the above step (2-2).

The invention further provides a high molecular weight aliphatic polyester which is represented by the following formula (I):

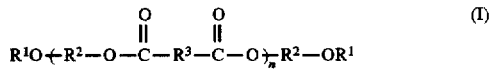

wherein $R^1$ is a hydrogen atom or a $C_1$ to $C_8$ alkyl group; $R^2$ and $R^3$ may be independent from each other and represent a $C_2$ to $C_{12}$ alkylene group; and n represents a polymerization degree, and which has a number average molecular weight of larger than 70,000.

DETAILED DESCRIPTION OF THE INVENTION

Examples of the diester of a dibasic aliphatic carboxylic acid used in the invention include dialkyl esters of $C_2$–$C_{14}$ dibasic carboxylic acid, such as diesters of succinic acid, adipic acid, dodecane dicarboxylic acid, oxalic acid, malonic acid, glutaric acid, pimelic acid, suberic acid, azelaic acid, sebasic acid, undecanedioic acid and dodecanedioic acid. The dialkyl esters include dimethyl esters, methylethyl esters, diethyl esters, methyl propyl esters, ethyl propyl esters, dipropyl esters and dibutyl esters. Most of diesters of dibasic aliphatic carboxylic acids are liquid at room temperature and, accordingly, may be stirred with ease and higher stirring efficiency at the beginning of the reaction, compared to the corresponding dibasic carboxylic acids. Dimethyl or diethyl esters of the aforesaid dibasic aliphatic carboxylic acids are preferred on account of their lower costs and easiness of reaction operations. Among others, dimethyl succinate, diethyl succinate and dibutyl succinate are preferred. More specifically, diethyl succinate is more preferable than dimethyl succinate, because the former has a lower melting point and is liquid at room temperature, which makes it easier to handle, and also because it has a higher boiling point, which makes it possible to carry out the normal pressure reaction at a higher temperature. The diesters of dibasic aliphatic carboxylic acids may be used alone or in a mixture thereof. Preferably, the diester of the dibasic aliphatic carboxylic acid comprises at least 30% by weight of a diester of succinic acid, particularly diethyl succinate. For instance, use may be made of a mixture of 30 to 90% by weight of diethyl succinate and 10 to 70% by weight of another diester of dibasic aliphatic carboxylic acid, such as diethyl adipate and/or diethyl ester of dodecane dicarboxylic acid.

Examples of the aliphatic diol used in the invention include those having a $C_2$ to $C_{12}$ alkylene group, such as ethylene glycol, 1,4-butanediol, 1,6-hexanediol, 1,2-propanediol, 1,3-propanediol, 1,3-butanediol, 1,5-pentanediol, 3-methyl-1,5-pentanediol, 1,7-heptanediol, 1,8-octanediol, 1,9-nonanediol, 1,10-decanediol and neopentylglycol or homologues thereof. Among these, ethylene glycol, 1,4-butanediol and 1,6-hexanediol are preferred, as they give aliphatic polyesters which have high melting points and show good moldability. The aforesaid aliphatic glycols may be used alone or in a mixture of two or more of them. Preferably, the aliphatic glycol comprises at least 70% by weight of 1,4-butanediol.

Preferably, 1 to 2 moles of the aliphatic glycol is charged in the reaction system per mole of the diester of the dibasic aliphatic carboxylic acid.

Examples of the catalyst used in the invention includes compounds of Ti, Ge, Zn, Fe, Mn, Sn, Co, Zr, V, Ir, Ce, Li and Ca, preferably alkoxides and acetylacetonate of these metals. Among these, oxobis (acetylacetonato) titanium, dibutoxydiacetoxy titanium, and tetraalkoxy titanium such as tetraethoxy titanium, tetraisopropoxy titanium and tetrabutoxy titanium are more preferred, as they are highly active. Organic acid salts, e.g., acetate, of the above metals may also be used. The catalyst may be used in a conventional amount, usually about 10 to about 0.01 m mole, preferably about 5 to about 0.1 m mole, per mole of the starting diester of the dibasic aliphatic carboxylic acid. Here, the amount of the catalyst means a total of the catalyst which is added portionwise at least twice.

Basic Embodiment for Addition of the Catalyst in a Portion Manner

The present process is characterized in that a catalyst is added to the reaction system at least twice in a portion manner at an interval of at least ten minutes in a period of time of the reaction including a starting point of the reaction, whereby the aliphatic polyester obtained has a higher molecular weight. Preferably, the reaction is carried out at atmospheric pressure and subsequently at a reduced pressure, and the catalyst is added to the reaction system once at the starting point of the reaction and then at least once during the reaction at a reduced pressure, particularly 30 minutes to 5 hours after starting reducing the pressure. More preferably, the catalyst is added at the starting point of the reaction and at a time point approximately 2 hours after starting reducing the pressure. A higher molecular weight and less discoloration in an aliphatic polyester are attained in the present process where a catalyst is portionwise added at least twice, compared to a process where the same amount of the catalyst is added once at a starting point of the reaction.

The amount of a catalyst to be added each time may be a constant amount obtained by dividing a total amount of a catalyst by the number of times of the addition, but not limited to this. Preferably, the amount of a catalyst to be added each time is at least $0.1X/n$, more preferably at least $0.3X/n$, where X represents the total amount of a catalyst and n represents the number of times of the addition.

The reaction is preferably carried out at atmospheric pressure and subsequently at a reduced pressure. The reaction at atmospheric pressure may be continued in an inert gas atmosphere at a temperature of about 20° to about 220° C. until distillation of the esterifying monovalent alcohol ends. Lower temperatures than the aforesaid temperature are impractical, as a reaction rate is too late. Higher temperatures than the aforesaid one is less preferred because of a high risk that the polymer might decompose.

The reaction at a reduced pressure is carried out at a pressure of about 30 to about 0.1 Torr at a temperature of about 150° to about 250° C. In order to obtain an aliphatic polyester of a higher molecular weight, it is preferred to conduct the reaction at a reduced pressure in at least two steps. For instance, a reactor is first evacuated to about 20 to about 5 Torr and the reaction is carried out at a temperature of about 150° to about 220° C. for about 0.5 to about 2 hours. Then, a vacuum is intensified to a range of from about 3 to about 0.5 Torr and the reaction is continued at a temperature of about 180° to about 250° C. for about 1 to about 10 hours. Even in the case of two or more steps evacuation, a catalyst may be added at any time during the reduced pressure reaction, but preferably added at least once in a second or later step. The latest addition of a catalyst is preferably conducted at least 30 minutes before the end of the reaction.

In the process according to the invention, various additives may be added to the reaction system as needed, such as antioxidants, reaction promotors and UV absorbents, whereby a time period of the process may be shortened and physical properties of the aliphatic polyester obtained may be improved.

Addition of Radical Scavenger

In a preferred embodiment of the present invention, 0.001 to 1 mole %, based on the diester of the dibasic aliphatic carboxylic acid, of a radical scavenger is added to the reaction system. Examples of the radical scavenger used include hydroquinone monoalkyl ethers, hindered phenols, and phosphoric esters. Among these, hydroquinone monoalkyl ethers containing one to six carbon atoms in the monoalkyl group are preferred, such as hydroquinone monomethyl ether, hydroquinone monoethyl ether, hydroquinone monopropyl ether and hydroquinone monobutyl ether. The aforesaid radical scavengers may be used alone or in a mixture of two or more of them. The amount of the radical scavenger is preferably at least 0.001 mole %, more preferably at least 0.005 mole %, particularly at least 0.01 mole %; and preferably at most 1 mole %, more preferably at most 0.1 mole %, particularly 0.05 mole %, based on the starting diester of the dibasic aliphatic carboxylic acid. The effect made by the addition of the radical scavenger is insufficient below the aforesaid lower limit of the amount of the radical scavenger. Meanwhile, no particular increase in the effect is seen above the aforesaid upper limit.

It is believed that the radical scavenger added to the reaction system suppresses formation of impurities, which in turn relieves hindrance to higher polymerization caused by impurities. As a result, a high molecular weight aliphatic polyester of a number average molecular weight in excess of about 40,000 may be prepared. In addition, the reaction temperature may be set higher, because less impurities are formed in this embodiment of the invention. As a result, the reaction may be carried out more efficiently, for instance, owing to decrease in a reaction time.

Timing of the addition of the radical scavenger to the reaction system is not particularly limited. However, the radical scavenger is preferably added at the starting point of the reaction so as to make better use of the aforesaid effect, i.e., the relief of hindrance to higher polymerization.

Aliphatic Polyester with Mn Larger Than 70,000

The present invention provides an aliphatic polyester with a number average molecular weight of larger than 70,000, which is represented by the aforesaid formula (I).

In formula (I), the $C_1$ to $C_8$ alkyl group may be linear or branched and includes methyl, ethyl, propyl, isopropyl, butyl, tert-butyl, pentyl, hexyl, heptyl and octyl groups.

The $C_2$ to $C_{12}$ alkylene group may be linear or branched, and includes methylene, ethylene, propylene, trimethylene, butylene, tetramethylene, pentamethylene, hexamethylene, heptamethylene, octamethylene, nonamethylene, decamethylene, undecamethylene and dodecamethylene groups. $R^2$ is preferably selected from ethylene, tetramethylene and hexamethylene groups. $R^3$ is preferably selected from ethylene and tetramethylene groups.

The aliphatic polyester of the invention has a number average molecular weight of larger than 70,000, and preferably at most 200,000. When a number average molecular weight exceeds 70,000 in the aliphatic polyester represented by formula (I), its melt flow rate (MFR) decreases drastically, and its Izod impact strength increases drastically.

The aliphatic polyester of the invention preferably has a ratio of the weight average molecular weight (Mw) to the number average molecular weight (Mn), Mw/Mn, of 1.0 to 4.0, more preferably 1.0 to 2.5. The aliphatic polyester of the invention preferably has a Mw larger than 100,000.

The aliphatic polyester of the invention preferably shows a MFR of 0.01 to 50 g/10 minutes, as determined at 190° C. with a load of 2.16 kg according to a method stipulated in the Japanese Industrial Standards.

The aliphatic polyester of the invention may be prepared in the following method: (1) the diester of the dibasic aliphatic carboxylic acid is reacted with the aliphatic glycol in the presence of a catalyst and 0.001 to 1 mole %, based on the diester of the dibasic aliphatic carboxylic acid, of a radical scavenger, at a pressure of from atmospheric pressure to 20 Torr at a temperature of 20° to 230° C. under distillation of the esterifying monovalent alcohol until the distillation is substantially completed; and then (2) the polycondensation reaction is carried out at a pressure of 30 to 0.05 Torr, preferably less than 1 Torr to 0.05 Torr, at a temperature of 150° to 250° C., preferably 200° to 250° C., for 1.5 to 12 hours, wherein the catalyst is added to the reaction system once at the starting point of the reaction and at least once in the above step (2).

Preferably, the aforesaid step (2) may be further divided into two substeps:

(2-1) the reaction is carried out at a pressure of 20 to 0.5 Torr at 150° to 250° C. for 0.5 to 2 hours, and further, (2-2) the reaction is continued at a pressure of 3 to 0.05 Torr, more preferably less than 1 Torr to 0.05 Torr, at 180° to 250° C., more preferably 200° to 250° C., for 1 to 10 hours; wherein the catalyst is added to the reaction system once at the starting point of the reaction and at least once in the above step (2-2).

In step (1), an ester (oligomer) is formed from the dicarboxylic acid and the diol via transesterification, liberating a monovalent alcohol from the ester moiety of the diester of the dibasic aliphatic carboxylic acid. In step (2), polycondensation proceeds further so that the ester becomes of higher molecular weight.

The higher molecular weight aliphatic polyester thus obtained may easily be molded, for instance, by injection, inflation or blowing, or into filaments and films, using apparatuses now generally used for general purpose resins without any alteration.

It should be noted that Polymer Preprints, Japan Vol. 42(9), 3688(1993) discloses that dimethyl succinate was obtained with a high yield from carbon monoxide and methanol in the presence of catalyst $CO_2(CO)_8$; and the dimethyl succinate obtained was reacted with various glycols at a reduced pressure (final pressure 0.3 to 0.5 Torr) at a temperature of 160° to 220° C. for 8 to 12 hours in the presence of 0.13 mole % of catalyst Zn $(OAc)_2.2H_2O$. The aliphatic polyester obtained there have a number average molecular weight of 30,000 to 40,000. Polymer Preprints, Japan Vol. 43(2), 448(1994) discloses that dimethyl succinate obtained as reported in the aforesaid Vol. 42(9) or other byproducts diesters were reacted with 1,4-butanediol in the presence of $Zn(OAc)_2.2H_2O$ for 1.5 to 9 hours. The number average molecular weight is 20,300 to 36,500. No description is seen on a manner of addition of the catalyst or use of a radical scavenger in either of the aforesaid literatures. As seen from comparison between the following Comparison Example 1 and Example 1 (and further Examples 9 and 14), simple (unhidden) technique of transesterification between a diester of succinate and an aliphatic glycol should result in a low molecular weight.

The invention will be further explained in reference to the following Examples which shall not be construed to limit the invention.

EXAMPLES

Addition of the Catalyst in a Portion Manner

Example 1

In a 500 ml separable flask provided with a stirrer, an inlet for nitrogen gas and a liebig condenser, 1.0 mole of diethyl succinate and 1.2 moles of 1,4-butanediol were placed. After purged the inside of the flask with nitrogen gas, 0.5 m mole of tetraisopropoxy titanium was added and the reaction temperature was raised gradually to 160° C. under vigorous stirring. Then, the reaction was continued at that temperature for about 2 hours until ethanol was not distilled any more. Subsequently, the inside of the flask was evacuated to 10 Torr and the reaction continued for further one hour, fol-

7 lowed by decompression to 1 Torr and one hour reaction. Then, 0.5 m mole of tetraisopropoxy titanium was replenished, the temperature was raised and the polycondensation was carried out at a reaction temperature of 220° C. and a pressure of 1 Torr for 4 hours.

A white resin was obtained with a yield above 95%, based on the diethyl succinate used.

The number average molecular weight (Mn) and the weight average molecular weight (Mw) were determined by gel permeation chromatography (GPC) under the following conditions and reduced on the basis of polymethyl methacrylate:

column: TSK-GEL G5000$H_{HR}$ and G3000$H_{HR}$, Tohso Co., Ltd.

eluent: 1,1,1,3,3,3-hexafluoroisopropanol containing 10 m mole of sodium trifluoroacetate per liter.

operation conditions: flow rate, 0.5 ml per minute; pressure, 55 kg/cm$^2$; column temperature, 30° C., and detector: differential refractometer.

The results are as shown in Table 1.

Further, the resultant resin was injection molded into test pieces at 150° C. Three days after the molding, physical properties were determined on the molded test pieces. The results are as shown in Table 2.

Example 2

The procedures of Example 1 were repeated to obtain a resin with the exception that the second addition of the catalyst was conducted immediately before the evacuation to 1 Torr. A resin was obtained with a yield above 95%. The Mn and Mw of the resultant resin are as shown in Table 1. Physical properties of molded test pieces were determined as in Example 1. The results are as shown in Table 2.

Example 3

The procedures of Example 1 were repeated to obtain a resin with the exception that a mixture of 80 wt. % of diethyl succinate and 20 wt. % of diethyl adipate was used as a diester of a dibasic aliphatic carboxylic acid. A resin was obtained with a yield above 90%. The Mn and Mw of the resultant resin are as shown in Table 1. Physical properties of molded test pieces were determined as in Example 1. The results are as shown in Table 2.

Example 4

The procedures of Example 1 were repeated to obtain a resin with the exception that a mixture of 60 wt. % of diethyl succinate and 40 wt. % of diethyl adipate was used as a diester of a dibasic aliphatic dicarboxylic acid. A resin was obtained with a yield above 90%. The Mn and Mw of the resultant resin are as shown in Table 1. Physical properties of molded test pieces were determined as in Example 1. The results are as shown in Table 2.

Example 5

The procedures of Example 1 were repeated to obtain a resin with the exception that a mixture of 40 wt. % of diethyl succinate, 30 wt. % of diethyl adipate and 30 wt. % of diethyl tetradecanedioate was used as a diester of a dibasic aliphatic dicarboxylic acid. A resin was obtained with a yield above 90%. The Mn and Mw of the resultant resin are as shown in Table 1. Physical properties of molded test pieces were determined as in Example 1. The results are as shown in Table 2.

Example 6

The procedures of Example 1 were repeated to obtain a resin with the exception that a mixture of 80 wt. % of 1,4-butanediol and 20 wt. % of ethyleneglycol was used as an aliphatic glycol. A resin was obtained with a yield above 90%. The Mn and Mw of the resultant resin are as shown in Table 1. Physical properties of molded test pieces were determined as in Example 1. The results are as shown in Table 2.

Example 7

The procedures of Example 1 were repeated to obtain a resin with the exception that a mixture of 80 wt. % of 1,4-butanediol and 20 wt. % of 1,6-hexanediol was used as an aliphatic glycol. A resin was obtained with a yield above 90%. The Mn and Mw of the resultant resin are as shown in Table 1. Physical properties of molded test pieces were determined as in Example 1. The results are as shown in Table 2.

Example 8

The procedures of Example 1 were repeated to obtain a resin with the exception that tetrabutoxy titanium was used as a catalyst. A resin was obtained with a yield above 95%. The Mn and Mw of the resultant resin are as shown in Table 1. Physical properties of molded test pieces were determined as in Example 1. The results are as shown in Table 2.

Comparison Example 1

The procedures of Example 1 were repeated to obtain a resin with the exception that 1.0 m mole of tetraisopropoxy titanium was added at the starting point of the reaction and no second addition of the catalyst took place. A resin was obtained with a yield of about 85%. The Mn and Mw of the resultant resin are as shown in Table 1. It was tried to determine physical properties of molded test pieces as in Example 1. However, the resultant resin was too brittle to endure the process of the molding and the measurement.

Comparison Example 2

In a 500 ml separable flask provided with a stirrer, an inlet for nitrogen gas and a liebig condenser, 1.0 mole of succinic acid and 1.2 moles of 1,4-butanediol were placed. After purged the inside of the flask with nitrogen gas, the reaction temperature was raised gradually to 200° C. under vigorous stirring. Then, the reaction was continued at that temperature until water was not distilled any more. Subsequently, the inside of the flask was evacuated to 10 Torr and the reaction continued for another one hour. Then, 1.2 m mole of tetraisopropoxy titanium was added, the pressure was decreased to 1 Torr, the temperature was raised and the polycondensation was carried out at a reaction temperature of 220° C. and a pressure of 1 Torr for 4 hours.

A white resin was obtained with a yield above 90%, based on the succinic acid used. The Mn and Mw of the resultant resin are as shown in Table 1. Physical properties of the resultant resin were determined as in Example 1. The results are as shown in Table 2.

TABLE 1

|  | Mn | Mw | Mw/Mn |
| --- | --- | --- | --- |
| Example 1 | 38000 | 94000 | 2.5 |
| 2 | 27000 | 54000 | 2.0 |
| 3 | 32000 | 89000 | 2.8 |
| 4 | 30000 | 79000 | 2.6 |
| 5 | 31000 | 96000 | 3.1 |
| 6 | 33000 | 92000 | 2.8 |
| 7 | 28000 | 76000 | 2.7 |
| 8 | 31000 | 79000 | 2.5 |
| Comp. Ex. 1 | 7800 | 18000 | 2.3 |
| 2 | 15300 | 45700 | 3.0 |

TABLE 2

|  | Bending Modulus, $kgf/cm^2$ | Strength at Break, $kgf/mm^2$ | Elongation at Break, % | Strength at Yielding Point, $kgf/mm^2$ |
| --- | --- | --- | --- | --- |
| Example 1 | 3400 | 6.3 | 790 | 6.5 |
| 2 | 3800 | 3.0 | 280 | 3.3 |
| 3 | 2700 | 4.8 | 730 | 5.6 |
| 4 | 2200 | 3.5 | 810 | 3.5 |
| 5 | 2900 | 3.7 | 870 | 2.8 |
| 6 | 4100 | 5.2 | 250 | 5.9 |
| 7 | 2600 | 4.2 | 920 | 3.3 |
| 8 | 3300 | 5.9 | 800 | 5.9 |
| Comp. Ex. 1 | * | * | * | * |
| 2 | 3500 | 2.6 | 370 | 3.0 |

*Measurement impossible

As seen from Examples 1 and 2 and Comparison Example 1, it is essential to portionwise add a catalyst at least twice to produce a high molecular weight aliphatic polyester having satisfactory physical properties. No cross-linking agent is needed in the present process, whereby problems caused by nitrogen or metals often contained in cross-linking agents do not take place. In addition, as seen from Examples 3 to 7, physical properties such as bending modulus, tensile strength and impact strength can be controlled by using two or more diesters of dibasic aliphatic carboxylic acids or two or more of aliphatic glycols in polycondensation.

Addition of Radical Scavenger

Example 9

In a 500 ml separable flask provided with a stirrer, an inlet for nitrogen gas and a liebig condenser, 1.0 mole of diethyl succinate, 1.2 moles of 1,4-butanediol and 28 mg (0.23 m mole) of hydroquinone monomethylether were placed. After purged the inside of the flask with nitrogen gas, 0.5 m mole of tetraisopropoxy titanium was added and the reaction temperature was raised gradually to 200° C. under vigorous stirring. Then, the reaction was continued at that temperature for about 2 hours until ethanol was not distilled any more. Subsequently, the inside of the flask was evacuated to 10 Torr and the reaction continued for further one hour, followed by decompression to 1 Torr and one hour reaction. Then, 0.5 m mole of tetraisopropoxy titanium was replenished, the temperature was raised and the polycondensation was carried out at a reaction temperature of 220° C. and a pressure of 1 Torr for 4 hours.

A white resin was obtained with a yield above 95%, based on the diethyl succinate used.

The Mn and Mw of the resultant resin are as shown in Table 3, and the physical properties in Table 4.

Example 10

The procedures of Example 9 were repeated to obtain a resin with the exception that the second addition of the catalyst was conducted immediately before the evacuation to 1 Torr. A resin was obtained with a yield above 90%. The Mn and Mw of the resultant resin are as shown in Table 3.

Example 11

The procedures of Example 9 were repeated to obtain a resin with the exception that tetrabutoxy titanium was used as a catalyst. A resin was obtained with a yield above 95%. The Mn and Mw of the resultant resin are as shown in Table 3.

Example 12

The procedures of Example 9 were repeated to obtain a resin with the exception that use was made of dibutyl succinate as a diester of a dibasic aliphatic carboxylic acid and 1,6-hexanediol as an aliphatic diol and the reaction temperature at normal pressure was raised to 230° C. A resin was obtained with a yield above 85%. The Mn and Mw of the resultant resin are as shown in Table 3.

Example 13

The procedures of Example 9 were repeated to obtain a resin with the exception that 14 mg (0.11 m mole) of hydroquinone monobutylether were used as a radical scavenger. A resin was obtained with a yield above 90%. The Mn and Mw of the resultant resin are as shown in Table 3.

Comparison Example 3

The procedures of Example 9 were repeated to obtain a resin with the exception that hydroquinone monomethylether was not added. A resin was obtained with a yield above 90%. The Mn and Mw of the resultant resin are as shown in Table 3.

Comparison Example 4

The procedure of Example 10 were repeated with the exception that hydroquinone monomethylether was not added and the reaction temperature at normal pressure was 160° C. That is, this Comparison Example where no radical scavenger is added is same as Example 2 which is directed to the addition of a catalyst in a portion wise.

Comparison Example 5

In this Comparison Example, no scavenger was added and, furthermore, the catalyst was added all at once in a later stage of the reaction. In fact, this Comparison Example is same as Comparison Example 2.

TABLE 3

|  | Mn | Mw | Mw/Mn |
| --- | --- | --- | --- |
| Example 9 | 45000 | 95000 | 2.1 |
| 10 | 42000 | 104000 | 2.5 |
| 11 | 45000 | 99000 | 2.2 |
| 12 | 39000 | 112000 | 2.9 |
| 13 | 43000 | 101000 | 2.3 |
| Comp. Ex. 3 | 23000 | 65000 | 2.8 |
| 4 | 27000 | 54000 | 2.0 |
| 5 | 15300 | 45700 | 3.0 |

TABLE 4

|  | Bending Modulus, kgf/cm² | Strength at Break, kgf/mm² | Elongation at Break, % | Strength at Yielding Point, kgf/mm² | Izod Impact Strength, kgf·cm/cm |
|---|---|---|---|---|---|
| Example 9 | 2900 | 6.3 | 790 | 6.7 | 9.0 |
| Comp. Ex. 4 | 3800 | 3.0 | 280 | 3.3 | 1.6 |

Aliphatic Polyester with Mn Larger Than 70,000

Example 14

(1) In a 500 ml separable flask provided with a mechanical stirrer, an inlet for nitrogen gas and a liebig condenser, 1.0 mole of diethyl succinate, 1.2 moles of 1,4-butanediol and 28 mg (0.23 m mole) of hydroquinone monomethylether were placed. After purged the inside of the flask with nitrogen gas, 0.5 m mole of tetraisopropoxy titanium was added and the reaction temperature was raised gradually to 200° C. under vigorous stirring. Then, the reaction was continued at that temperature until ethanol was not distilled any more.

(2-1) Subsequently, the inside of the flask was evacuated gradually to 1Torr and the reaction continued for further one hour.

(2-2) Then, 0.5 m mole of tetraisopropoxy titanium was replenished, and the polycondensation was carried out at a reaction temperature of 220° C. and a pressure of 0.1 Torr for 5 hours.

A white resin was obtained with a yield above 95%, based on the diethyl succinate used. The structure of the resultant resin was confirmed by ¹H-NMR, ¹³C-NMR and IR. It was confirmed that in the aforesaid formula (I), $R^1$ is a hydrogen atom; $R^2$ is —$CH_2CH_2CH_2CH_2$—; and $R^3$ is —$CH_2CH_2$—.

Its Mn and Mw were determined as described in Example 1.

The melt flow rate (MFR) at 190° C. with a load of 2.16 kg was determined according to the Japanese Industrial Standards. Izod impact strength with notch was also determined. The results are as shown in Table 5.

Example 15

The procedures of Example 14 were repeated to obtain a resin with the exception that the reaction in step (2-2) was conducted at 240° C. and 0.1 Torr for 2 hours. A resin was obtained with a yield above 90%. The structure was confirmed as in Example 14. The Mn, Mw, MFR and Izod impact strength are as shown in Table 5.

Example 16

The procedures of Example 14 were repeated to obtain a resin with the exception that tetrabutoxy titanium was used in place of tetraisopropoxy titanium as a catalyst. A resin was obtained with a yield above 95%. The structure was confirmed as in Example 14. The Mn, Mw, MFR and Izod impact strength are as shown in Table 5.

Example 17

The procedures of Example 14 were repeated to obtain a resin with the exception that 14 mg of hydroquinone monobutylether were used in place of 28 mg of hydroquinone monomethylether as a radical scavenger. A resin was obtained with a yield above 95%. The structure was confirmed as in Example 14. The Mn, Mw, MPR and Izod impact strength are as shown in Table 5.

Comparison Example 6

In an apparatus as used in Example 14, 1.0 mole of succinic acid and 1.2 moles of 1,4-butanediol were placed. After purged the inside of the flask with nitrogen gas, the reaction temperature was raised gradually to 200° C. under stirring. Then, the reaction was continued at that temperature until water was not distilled any more.

(2-1) Subsequently, the inside of the flask was evacuated gradually to 10 Torr and the reaction continued for further one hour (2-2) Then, 1.0 m mole of tetraisopropoxy titanium was added, and the polycondensation was carried out at a reaction temperature of 240° C. and a pressure of 0.1 Torr for 3 hours. A resin was obtained with a yield of 95%. The structure was confirmed as in Example 14. The Mn and Mw, MFR and Izod impact strength are as shown in Table 5.

TABLE 5

|  | Mn | Mw | Mw/Mn | MFR, g/10 min. | Izod Impact Strength, kgf·cm/cm |
|---|---|---|---|---|---|
| Ex. 14 | 76000 | 160000 | 2.1 | 20 | not broken |
| 15 | 87000 | 220000 | 2.5 | 7 | not broken |
| 16 | 77000 | 150000 | 1.9 | 20 | not broken |
| 17 | 77000 | 160000 | 2.1 | 12 | not broken |
| Comp. Ex. 6 | 15000 | 61000 | 4.1 | 2.2 | 5.4 |

Example 18

The procedures of Example 14 were repeated to obtain a resin with the exception that dibutyl succinate and 1,6-hexanediol were used in place of diethyl succinate and 1,4-butanediol and the upper limit of the temperature in step (1) was 230° C. A resin was obtained with a yield above 90%. The structure was confirmed by ¹H-NMR, ¹³C-NMR and IR as in Example 14. It was confirmed that in the aforesaid formula (I), $R^1$ is a hydrogen atom; $R^2$ is —$CH_2CH_2CH_2CH_2CH_2CH_2$—; and $R^3$ is —$CH_2CH_2$—. The Mn, Mw, MFR and Izod impact strength are as shown in Table 6.

TABLE 6

|  | Mn | Mw | Mw/Mn | MFR, g/10 min. | Izod Impact Strength, kgf·cm/cm |
|---|---|---|---|---|---|
| Ex. 18 | 72000 | 170000 | 2.4 | 18 | not broken |

What is claimed is:

1. A process for the preparation of an aliphatic polyester of the formula:

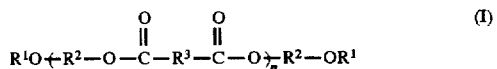

(I)

wherein $R^1$ is a hydrogen atom or a $C_1$ to $C_8$ alkyl group; $R^2$ and $R^3$ may be independent form each other and may each represent a $C_2$ to $C_{12}$ alkylene group; and n represents a polymerization degree, and which has a number average molecular weight of larger than 70,000 by reaction of a diester of a dibasic aliphatic carboxylic acid with an aliphatic glycol, characterized in that a catalyst is portionwise added to a reaction system at least twice at an interval of at least ten minutes in a period of time of the reaction including a starting point of the reaction.

2. The process for the preparation of an aliphatic polyester claimed in claim 1, wherein the diester of the dibasic aliphatic carboxylic acid comprises at least 30 wt. % of a succinic acid diester.

3. The process for the preparation of an aliphatic polyester claimed in claim 1, wherein the diester of the dibasic aliphatic carboxylic acid comprises at least 30 wt. % of diethyl succinate.

4. The process for the preparation of an aliphatic polyester claimed in claim 1, wherein the aliphatic glycol comprises at least 70 wt. % of 1,4-butanediol.

5. The process for the preparation of an aliphatic polyester claimed in claim 1, wherein the reaction is carried out at atmospheric pressure and subsequently at a reduced pressure, and the catalyst is added to the reaction system once at the starting point of the reaction and then at least once during the reaction under reduced pressure.

6. The process for the preparation of an aliphatic polyester claimed in claim 1, wherein the reaction is carried out at atmospheric pressure and subsequently at a reduced pressure, and the catalyst is added to the reaction system once at the starting point of the reaction and at least once 30 minutes to 5 hours after starting reducing the pressure.

7. The process for the preparation of an aliphatic polyester claimed in claim 1, wherein the reaction is carried out at atmospheric pressure and subsequently at a reduced pressure; the catalyst is added to the reaction system once at the starting point of the reaction and at least once 30 minutes to 5 hours after starting reducing the pressure; the reaction at atmospheric pressure is carried out at a temperature of 20° to 220° C. in an inert gas atmosphere until distillation of an esterifying monovalent alcohol is substantially completed; and the reaction at a reduced pressure is carried out at a pressure of 20 to 5 Torr at a temperature of 150° to 220° C. for 0.5 to 2 hours and subsequently at a pressure of 3 to 0.5 Torr at a temperature 180° to 250° C. for 1 to 10 hours.

8. The process for the preparation of an aliphatic polyester claimed in claim 1, wherein the reaction is carried out at atmospheric pressure and subsequently at a reduced pressure; the reaction at atmospheric pressure is carried out at a temperature of 20° to 220° C. in an inert gas atmosphere until distillation of an esterifying monovalent alcohol is substantially completed and the reaction at a reduced pressure is carried out at a pressure of 20 to 5 Torr at a temperature of 150° to 220° C. for 0.5 to 2 hours and subsequently at a pressure of about 3 to 0.5 Torr at a temperature of 180° to 250° C. for 1 to 10 hours; and the catalyst is added to the reaction system once at the starting point of the reaction and at least once during the reaction at the reduced pressure of 3 to 0.5 Torr.

9. The process for the preparation of an aliphatic polyester claimed in claim 1, wherein 0.001 to 1 mole %, based on the diester of the dibasic aliphatic carboxylic acid, of a radical scavenger is added to the reaction system.

10. The process for the preparation of an aliphatic polyester claimed in claim 1, wherein 0.001 to 1 mole %, based on the diester of the dibasic aliphatic carboxylic acid, of a hydroquinone monoalkyl ether is added as a radical scavenger to the reaction system.

11. The process for the preparation of an aliphatic polyester claimed in claim 1, wherein the process comprises steps of (1) carrying out the reaction in the presence of 0.001 to 1 mole %, based on the diester of the dibasic aliphatic carboxylic acid, of a radical scavenger at a pressure of from atmospheric pressure to 20 Torr at a temperature of 20° to 230° C. under distillation of an esterifying monovalent alcohol until the distillation is substantially completed; and then (2) carrying out a polycondensation reaction at a pressure of 30 to 0.05 Torr at a temperature of 150° to 250° C. for 1.5 to 12 hours, wherein the catalyst is added to the reaction system once at the starting point of the reaction and at least once in the above step (2).

12. The process for the preparation of an aliphatic polyester claimed in claim 1, wherein the process comprises steps of (1) carrying out the reaction in the presence of 0.001 to 1 mole %, based on the diester of the dibasic aliphatic carboxylic acid, of a radical scavenger at a pressure of from atmospheric pressure to 20 Torr at a temperature of 20° to 230° C. under distillation of an esterifying monovalent alcohol until the distillation is substantially completed; and then (2) carrying out a polycondensation reaction at a pressure of less than 1 Torr to 0.05 Torr at 200° to 250° C. for 1.5 to 12 hours, wherein the catalyst is added to the reaction system once at the starting point of the reaction and at least once in the above step (2).

13. The process for the preparation of an aliphatic polyester claimed in claim 1, wherein the process comprises steps of (1) carrying out the reaction in the presence of 0.001 to 1 mole %, based on the diester of the dibasic aliphatic carboxylic acid, of a radical scavenger at a pressure of from atmospheric pressure to 20 Torr at a temperature of 20° to 230° C. under distillation of an esterifying monovalent alcohol until the distillation is substantially completed; and then (2-1) carrying out a polycondensation reaction at a pressure of 20 to 0.5 Torr at 150° to 250° C. for 0.5 to 2 hours, and further, (2-2) carrying out the polycondensation reaction at a pressure of 3 to 0.05 Torr at 180° to 250° C. for 1 to 10 hours;

wherein the catalyst is added to the reaction system once at the starting point of the reaction and at least once in the above step (2-2).

14. The process for the preparation of an aliphatic polyester claimed in claim 1, wherein the process comprises steps of (1) carrying out the reaction in the presence of 0.001 to 1 mole %, based on the diester of the dibasic aliphatic carboxylic acid, of a radical scavenger at a pressure of from atmospheric pressure to 20 Torr at a temperature of 20° to 230° C. under distillation of an esterifying monovalent alcohol until the distillation is substantially completed, and then (2-1) carrying out a polycondensation reaction at a pressure of 20 to 0.5 Torr at 150° to 250° C. for 0.5 to 2 hours, and further, (2-2) carrying out the polycondensation reaction at a pressure of less than 1 Torr to 0.05 Torr at 200° to 250° C. for 1 to 10 hours;

wherein the catalyst is added to the reaction system once at the starting point of the reaction and at least once in the above step (2-2).

15. The process for the preparation of an aliphatic polyester claimed in claim 1, wherein the catalyst is an alkoxide or acetylacetonate of a metal selected from the group consisting of Ti, Ge, Zn, Fe, Mn, Sn, Co, Zr, V, Ir, Ce, Li and Ca.

16. The process for the preparation of an aliphatic polyester claimed in claim 1, wherein the catalyst is tetraalkoxy titanium.

17. A high molecular weight aliphatic polyester, which is represented by the following formula (I):

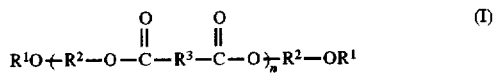
(I)

wherein $R^1$ is a hydrogen atom or a $C_1$ to $C_8$ alkyl group; $R^2$ and $R^3$ may be independent from each other and represent a $C_2$ to $C_{12}$ alkylene group; and n represents a polymerization degree, and which has a number average molecular weight of larger than 70,000.

18. The high molecular weight aliphatic polyester claimed in claim 17, wherein a ratio of a weight average molecular weight (Mw) to a number average molecular weight (Mn), Mw/Mn, is in a range of from 1.0 to 4.0.

19. The high molecular weight aliphatic polyester claimed in claim 17, wherein a weight average molecular weight is larger than 100,000.

* * * * *